United States Patent
Hrachova et al.

(10) Patent No.: US 9,758,656 B2
(45) Date of Patent: Sep. 12, 2017

(54) SOFT TOUCH COMPOSITIONS AND ARTICLES THEREOF

(71) Applicant: SABIC GLOBAL TECHNOLOGIES B.V., Bergen op Zoom (NL)

(72) Inventors: Jana Hrachova, Geleen (NL); Franciscus Elisabeth Jacobus Essers, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/915,452

(22) PCT Filed: Aug. 27, 2014

(86) PCT No.: PCT/IB2014/064099
§ 371 (c)(1),
(2) Date: Feb. 29, 2016

(87) PCT Pub. No.: WO2015/028955
PCT Pub. Date: Mar. 5, 2015

(65) Prior Publication Data
US 2016/0208084 A1    Jul. 21, 2016

Related U.S. Application Data

(60) Provisional application No. 61/871,016, filed on Aug. 28, 2013.

(30) Foreign Application Priority Data

Sep. 5, 2013   (EP) .................................... 13183137

(51) Int. Cl.
*C08L 23/12*        (2006.01)

(52) U.S. Cl.
CPC ........... *C08L 23/12* (2013.01); *C08L 2201/08* (2013.01); *C08L 2205/02* (2013.01); *C08L 2205/03* (2013.01); *C08L 2205/035* (2013.01); *C08L 2207/02* (2013.01)

(58) Field of Classification Search
CPC . C08K 5/04; B29C 45/16; C08L 23/12; C08L 2205/03; C08L 2205/035; C08L 2201/08
USPC ................................................. 524/381, 494
See application file for complete search history.

(56) References Cited

U.S. PATENT DOCUMENTS

| | | | |
|---|---|---|---|
| 3,496,126 A | 2/1970 | Burzynski | |
| 4,278,586 A * | 7/1981 | Marzola | C08K 5/20 524/285 |
| 5,286,776 A | 2/1994 | Ichikawa et al. | |
| 5,412,020 A | 5/1995 | Yamamoto et al. | |
| 5,916,953 A | 6/1999 | Jacoby et al. | |
| 6,107,226 A | 8/2000 | Chevallier | |
| 6,498,214 B2 | 12/2002 | Laughner et al. | |
| 6,569,931 B2 | 5/2003 | Furukawa et al. | |
| 6,632,885 B2 | 10/2003 | Morizono et al. | |
| 6,638,587 B1 | 10/2003 | Wang et al. | |
| 6,696,520 B1 | 2/2004 | Pellegatti et al. | |
| 6,734,253 B2 | 5/2004 | Krabbenborg et al. | |
| 6,797,779 B1 | 9/2004 | Ajbani et al. | |
| 6,949,605 B2 | 9/2005 | Shankernarayanan et al. | |
| 7,459,500 B2 | 12/2008 | Tau et al. | |
| 7,538,154 B2 | 5/2009 | Pohl et al. | |
| 7,592,396 B2 | 9/2009 | Pelliconi et al. | |
| 7,741,398 B2 | 6/2010 | Heck | |
| 8,163,378 B2 | 4/2012 | Soliman et al. | |
| 2001/0031849 A1 | 10/2001 | Harada et al. | |
| 2002/0041057 A1 | 4/2002 | Migliorini et al. | |
| 2002/0061976 A1 | 5/2002 | Krabbenborg et al. | |
| 2002/0065357 A1 | 5/2002 | Guebitz | |
| 2002/0107328 A1 | 8/2002 | Laughner et al. | |
| 2003/0181581 A1 * | 9/2003 | Chang | C08F 265/04 525/66 |
| 2004/0249080 A1 | 12/2004 | Shankernarayanan et al. | |
| 2006/0189759 A1 * | 8/2006 | Walther | C08L 23/0815 525/192 |
| 2006/0199906 A1 * | 9/2006 | Walton | C08F 297/086 525/191 |
| 2007/0066756 A1 * | 3/2007 | Poon | C08F 10/00 525/191 |
| 2007/0093585 A1 * | 4/2007 | Syed | C08L 23/04 524/423 |
| 2008/0167597 A1 | 7/2008 | Dougherty | |
| 2009/0018253 A1 | 1/2009 | Thomas | |
| 2009/0105397 A1 | 4/2009 | Van Riel et al. | |
| 2009/0149605 A1 | 6/2009 | Li et al. | |
| 2009/0163659 A1 | 6/2009 | Gemeinhardt et al. | |
| 2010/0249326 A1 | 9/2010 | Bernreitner et al. | |
| 2010/0331466 A1 * | 12/2010 | Ouhadi | C08L 23/0815 524/381 |
| 2010/0331475 A1 | 12/2010 | Hong et al. | |
| 2011/0003929 A1 | 1/2011 | Soediono et al. | |
| 2012/0029133 A1 | 2/2012 | Stoppelmann et al. | |
| 2012/0208926 A1 | 8/2012 | Funabiki et al. | |

FOREIGN PATENT DOCUMENTS

| | | | |
|---|---|---|---|
| DE | 102005041423 A1 | 3/2006 | |
| EP | 0771846 A1 | 5/1997 | |
| EP | 1323778 B1 | 12/2004 | |
| EP | 1963407 B1 | 11/2010 | |
| EP | 2308923 B1 | 5/2012 | |

(Continued)

OTHER PUBLICATIONS

Zweifel Hans et al., "Plastics Additives Handbook," Hanser Gardner Publications, Cincinnati, Ohio, 5$^{th}$ edition, Chapter 17, pp. 931-932 (2001).*

(Continued)

*Primary Examiner* — Deve E Valdez
(74) *Attorney, Agent, or Firm* — Cantor Colburn LLP

(57) ABSTRACT

A soft touch composition comprises, based on the total weight of the composition, 50 to 88 wt % of a polymer comprising, based on the total weight of the polymer, 44 to 52 wt % of a polypropylene homopolymer, 3 to 30 wt % of an ethylene-propylene copolymer, and 22 to 52 wt % of an ethylene-$C_4$ to $C_8$ alpha olefin copolymer, and 10 to 40 wt % of glass fibers.

17 Claims, No Drawings

(56) References Cited

FOREIGN PATENT DOCUMENTS

| | | | |
|---|---|---|---|
| GB | 2143831 | A | 2/1985 |
| GB | 2312427 | A | 10/1997 |
| WO | 9314423 | A1 | 7/1993 |
| WO | 9622327 | A1 | 7/1996 |
| WO | 0075225 | A2 | 12/2000 |
| WO | 03066731 | A1 | 8/2003 |
| WO | 2004037916 | A2 | 5/2004 |
| WO | 2004087804 | A1 | 10/2004 |
| WO | 2005040263 | A1 | 5/2005 |
| WO | 2006101926 | A2 | 9/2006 |
| WO | 2006102154 | A2 | 9/2006 |
| WO | 2007011541 | A1 | 1/2007 |
| WO | 2007025663 | A1 | 3/2007 |
| WO | 2007071430 | A1 | 6/2007 |
| WO | 2007082571 | A1 | 7/2007 |
| WO | 2009047188 | A1 | 4/2009 |
| WO | 2009055486 | A1 | 4/2009 |
| WO | 2010069998 | A1 | 6/2010 |
| WO | 2011082019 | A1 | 7/2011 |

OTHER PUBLICATIONS

CN101824190 A; Date of Publication Sep. 8, 2010; 1 page; English Abstreact.
CN102086287 A; Date of Publication Jun. 8, 2011; 1 page; English Abstract.
DE102005041423 A1; Date of Publication Mar. 16, 2006; 1 page; English Abstract.
International Application No. PCT/IB2014/064099; International Filing Date Aug. 27, 2014; International Searching Report; 4 pages.
International Application No. PCT/IB2014/064099; International Filing Date Aug. 27, 2014; Written Opinion of the International Searching Authority; 3 pages.
JP 2010018707 A; Date of Publication Jan. 28, 2010; 2 pages; English Abstract.
JP2000191861 A; Date of Publication Jul. 11, 2000; 1 page; English Abstract.
JP2000263571 A; Date of Publication Sep. 26, 2000; 2 pages; English Abstract.
JP2001047577 A; Date of Publication Feb. 20, 2001; 2 pages; English Abstract.
JP2006175825 A; Date of Publication Jul. 6, 2006; 2 pages; English Abstract.
JP2006241454 A; Date of Publication Sep. 14, 2006; 1 page; English Abstract.
JPH04290745 A; Date of Publication Oct. 15, 1992; 1 page; English Abstract.
JPH0639893 A; Date of Publication Feb. 15, 1994; 1 page; English Abstract.
JPH07125155 A; Date of Publication May 16, 1995; 2 pages; English Abstract.
KR20000039269 A; Date of Publication Jul. 5, 2000; 1 page; English Abstract.
Shearer; "Silicones in the Plastics Industry"; Inorganic Polymers; Chapter 15; Nova Science Publishers; 6 pages; https://www.dowcorning.com/content/publishedlit/Chapter15.pdf; downloaded Feb. 29, 2016.

\* cited by examiner

SOFT TOUCH COMPOSITIONS AND ARTICLES THEREOF

BACKGROUND

The present disclosure relates to polyolefin compositions, and in particular to blended polyolefinic materials, which, after molding, provide a soft touch feel.

Soft touch materials have found applications in many industries. For example, soft touch materials can be utilized in automotive interior components such as trim components, grips on steering wheels, and shifters. Electronic industries also utilize soft touch materials on the grips and protective coverings of handheld electronic devices. Other applications can vary, for example soft touch materials can be found in tool handles and tooth brushes.

One way to impart a soft touch feel is to use a multi-step process applying a secondary layer of functional material on top of a molded article through overmolding, painting, or other techniques. Another way to impart a soft touch feel is to provide a material, which on its own, is suitable for producing articles having a soft touch feel.

Despite all the research and studies, there remains a need to provide a polymeric composition, particularly, a polyolefin composition that can exhibit a relatively soft touch feel. It would be a further advantage if such a composition additionally has one or more of low gloss, good impact properties, good flexural properties, good tensile properties, good scratch resistance, and practical hardness values.

SUMMARY

Disclosed herein is a soft touch composition comprising, based on the total weight of the composition, 50 to 88 wt % of a polymer comprising, based on the total weight of the polymer, 44 to 52 wt % of a polypropylene (PP) homopolymer, 3 to 30 wt % of an ethylene-propylene copolymer, and 22 to 52 wt % of an ethylene-$C_4$ to $C_8$ alpha olefin copolymer, and 10 to 40 wt % of glass fibers.

Also disclosed is an article made from the soft touch composition.

The above described and other features are exemplified by the following detailed description.

DETAILED DESCRIPTION

The inventors hereof have discovered that soft touch olefinic compositions having good mechanical properties can unexpectedly be obtained by combining different olefinic polymers in particular amounts. Glass fibers can be present to further improve mechanical properties of the compositions. It has also been surprisingly found that an addition of silicone particles, for example, methylsilsequioxane particles, unexpectedly improves the soft touch feel of the compositions without adversely affecting the melt flow properties, notched Izod impact properties, or surface properties of the compositions. It was also surprisingly found that in some instances the addition of the silicone particles actually improved the flexural and tensile properties, while providing desirable gloss properties.

Accordingly, provided herein is a soft touch composition comprising, based on the total weight of the composition, 50 to 88 weight percent (wt %) of a polymer and 10 to 40 wt % of glass fibers, wherein the polymer comprises a polypropylene homopolymer, an ethylene-propylene copolymer, and an ethylene-$C_4$ to $C_8$ alpha olefin copolymer. The soft touch composition can also comprise 60 to 70 wt %, specifically, 65 to 70 wt % of the polymer and 20 to 30 wt %, specifically, 20 to 25 wt % of glass fibers. The soft touch composition can further comprise 0 to 10 wt % of an additive, specifically, 0.1 to 10 wt % based on the total weight of the composition.

The polymer component of the soft touch composition can comprise a polypropylene homopolymer, for example, in an amount of 44 to 52 wt %, specifically, 45 to 50 wt %, more specifically, 47 to 49 wt %, based on the total weight of the polymer component. The polypropylene homopolymer can have a melt flow index of 5 to 150 grams per 10 minutes (g/10 min), specifically, 10 to 150 g/10 min, more specifically, 10 to 70 g/10 min, measured at 230° C. under 2.16 kilogram (kg) force according to ISO 1133.

An ethylene-propylene copolymer can be present in the polymer component of the soft touch composition in an amount of 3 to 30 wt %, specifically, 5 to 20 wt %, more specifically, 10 to 15 wt %. A cold xylene soluble fraction of the ethylene-propylene copolymer can have an intrinsic viscosity of 2 to 8 deciliters per gram (dl/g), specifically, 2.5 to 6.5 dl/g measured in decalin at 135 degrees Celsius (° C.). A cold xylene soluble fraction of the ethylene-propylene copolymer can have an intrinsic viscosity of greater than 3, more specifically, greater than 4, measured in decalin at 135° C. The extraction of cold xylene soluble fraction (CXS) is performed at 25° C. according to ISO-16152.

The ethylene-propylene copolymer can be a random or block copolymer. The copolymer is derived from at least propylene and ethylene. The ethylene-propylene copolymer can comprise 55 to 95 wt %, specifically, 80 to 95 wt % polypropylene and 5 to 45 wt %, specifically, 5 to 20 wt % ethylene based on the total weight of the ethylene-propylene copolymer.

The polymer component of the soft touch composition further comprises an ethylene-$C_4$ to $C_8$ alpha olefin copolymer in an amount of 22 to 52 wt %, specifically, 28 to 46 wt %, more specifically, 33 to 40 wt %, based on the total weight of the polymer component. The ethylene-$C_4$ to $C_8$ alpha olefin copolymer can be a random or block copolymer derived from ethylene and at least one $C_4$ to $C_8$ alpha olefin. Exemplary $C_4$ to $C_8$ alpha olefins include 1-butene, 1-pentene, 4-methyl-1-pentene, 1-hexene, 1-heptene, and 1-octene, among which, 1-octene is specifically mentioned. The ethylene content of said copolymer can vary widely, for example, 40 to 80 wt %, specifically, 50 to 75 wt %, more specifically, 60 to 75 wt %. The ethylene-$C_4$ to $C_8$ alpha olefin copolymer can have a density of 850 to 880 kilogram per meter cubed (kg/m$^3$) and a melt flow index of 0.5 to 35 g/10 min, specifically, 1 to 30 g/10 min, more specifically, 2 to 10 g/10 min, even more specifically, 4 to 6 g/10 min, measured at 190° C. under 2.16 kg force according to ISO 1133.

The polymer component of the soft touch composition can be prepared by combining a polypropylene homopolymer and an ethylene-propylene copolymer together as a first component and an ethylene-$C_4$ to $C_8$ alpha olefin copolymer as a second component.

The first component can be heterophasic comprising at least two phases, for example, a crystalline polypropylene homopolymer-based matrix and a dispersed ethylene-propylene elastomeric phase. The first component can be prepared in one or more reactors, by polymerization of, for example, propylene in the presence of a catalyst, and subsequent polymerization of a propylene-ethylene mixture, but can also be prepared by blending the polypropylene and the ethylene-propylene copolymer components. The specific morphology of the resulting heterophasic structure is dependent upon the preparation method and the monomers from which the polymers were derived and their relative amounts.

The heterophasic structure can comprise greater than or equal to 20 wt %, specifically, 50 to 95 wt % of a crystalline propylene homopolymer matrix, and 5 to 50 wt % of a dispersed copolymer of ethylene and propylene, based on the total amount of the heterophasic composition. The amount of dispersed phase can be 10 to 50 wt %, specifically, 15 to 35 wt %, more specifically, 20 to 35 wt %, even more specifically, 17 to 25 wt % based on the total amount of heterophasic composition.

The melt flow index (MFI) of the heterophasic composition (measured in accordance with ISO 1133 using a 2.16 kg weight and at a temperature of 230° C.) can be 1 to 100 g/10 min, for example, 10 to 40 g/10 min. The melt flow index (MFI) of the heterophasic composition (measured in accordance with ISO 1133 using a 2.16 kg weight and at a temperature of 230° C.) can be less than or equal to 65 g/10 min, specifically, 1 to 65 g/10 min.

A cold xylene soluble fraction of the heterophasic composition can have an intrinsic viscosity of 1.5 to 6 dl/g, specifically greater than 3, measured in decalin at 135° C. A cold xylene insoluble fraction (CXI) of the heterophasic composition can have an intrinsic viscosity of 1 to 3 dl/g, measured in decalin at 135° C. The extraction of CXS and CXI is performed at 25° C. according to ISO16152.

The composition can comprise glass fibers. The glass fibers, as added to the composition, can comprise long and/or short glass fibers. Long glass fibers can have an average length of greater than or equal to 1 millimeter (mm), specifically, the long glass fibers can have a length of 1 to 50 mm, specifically, 1 to 20 mm, more specifically, 5 to 15 mm. Short glass fibers can have a length of less than 1 mm. The length of the added glass fibers can decrease during processing and as such the final length of the glass fibers in the composition can be less than that of the added glass fibers.

The diameter of the glass fibers can be 5 to 50 micrometers, specifically, 8 to 30 micrometers, more specifically, 10 to 20 micrometers.

The glass fiber can be a coated glass fiber and can be prepared from continuous lengths of fibers by, for example, a sheathing or wire-coating process, by crosshead extrusion, or by a pultrusion technique. Using these technologies, fiber strands impregnated or coated with a polymer are formed. The fiber can then be cut into a desired length and can optionally be formed into pellets or granules. The fibers can be further processed, e.g. by injection moulding or extrusion processes, into a composition.

The composition can comprise 0 to 10 wt % of silicone particles, specifically, 1 to 5 wt %, more specifically, 0.1 to 2 wt % of silicone particles based on the total weight of the composition. The composition can comprise 4 to 6 wt % of silicone particles based on the total weight of the composition. The silicone particles can be, for example, spherical, oblong, ovoidal, cylindrical, or a combination comprising one or more of the foregoing. Specifically, the silicone particles can be essentially spherical in shape and can have a mean bead diameter of 1.8 to 10.5 micrometers, specifically, 2 to 10 micrometers, more specifically, 5 to 7 micrometers. The bulk specific gravity of the silicone particles is 0.35 to 0.67 kilograms per liter (kg/l). The addition of the silicone particles can result in an improvement in the haptic properties as compared to a composition without said particles.

Silicone particles comprise a three-dimensional polymer chain of the formula (I):

$$R_xSiO_{2-(x/2)} \quad (I)$$

in which x is a positive number greater than or equal to 1, specifically, 1 to 1.9, more specifically, 1 to 1.5, and even more specifically, 1 to 1.2; and each R is independently an organic group, such as an aliphatic hydrocarbon group, e.g., methyl, ethyl, or butyl; or an aromatic hydrocarbon, e.g., phenyl, and can comprise an unsaturated group, e.g., vinyl.

In exemplary embodiments, R is a hydrocarbon group having 1 to 8, specifically, 1 to 5, carbon atoms, more specifically, methyl. Specifically mentioned silicon resin particles comprise methylsilsequioxane.

Suitable silicone particles are commercially available from Momentive Performance Materials Japan LLC, under the name of "Tospearl" silicone resin particles. These particles have a three-dimensional network structure in which each silicone atom is bonded to one methyl group.

The soft touch composition can comprise a modified polypropylene that can result in improved properties by affecting glass fiber-polypropylene interactions. Examples of suitable modified polypropylenes are polypropylenes grafted with for example an unsaturated organic compound, such as a carboxylic acid, an anhydride, an ester, or salts thereof. Suitable examples include maleic, fumaric, (meth) acrylic, itaconic or cinnamic acid or anhydride, ester or salt thereof. Suitable examples include maleic, fumaric, (meth) acrylic, itaconic or cinnamic acid or anhydride, ester or a salt thereof, among which, maleic anhydride is specifically mentioned. The grafted groups can be presented in an amount of greater than or equal to 0.5 wt %, specifically, greater than or equal to 0.7 wt %, based on the total weight of the modified polypropylene. The density of the modified polypropylene can be 0.8 to 1.0 g/cm$^3$, for example about 0.9 g/cm$^3$. The melt flow index of the modified polypropylene (measured in accordance with ISO 1133 using a 2.16 kg weight and at a temperature of 230° C.) can be greater than or equal to 25 g/10 min, for example, greater than or equal to 100 g/10 min. The modified polypropylene can be produced by reactive extrusion. As used herein, modified polypropylene comprises modified homopolypropylene, for example, maleic anhydride functionalized homopolypropylene produced by reactive extrusion.

The amount of modified polypropylene can vary widely, but for economical reasons the amount normally will be rather low, for example, less than or equal to 5 wt %, specifically, less than 4, 3, 2 or even 1 wt %, based on total weight of the composition. The modified polypropylene can be present in an amount of 0.1 to 4 wt %, based on the total weigh of the composition.

The composition can comprise an additive including a nucleating agent, a clarifier, a release agent, a plasticizer, an antioxidant, a stabilizer (such as a thermal stabilizer, a visible light stabilizer, an ultraviolet light stabilizer (such as a hindered amine light stabilizer), and an antioxidant), a colorant, a flame retardant, a lubricant (such as calcium stearate), a synergist, a mold release agent, a flow enhancer, an anti-static agent, a glass filler, a filler that is different from the glass filler (such as talc), a scratch resistant additive (such as a silicone, a low density polyethylene that can be a long chain branched low density polyethylene), or a combination comprising at least one of the foregoing. The additive can be present in an amount of 0.5 to 20 wt %, specifically, 2 to 15 wt %, based on the total weight of the composition. The additive can be present in an amount of 0 to 10 wt %, specifically, 2 to 10 wt %, based on the total weight of the composition.

The composition can comprise a processing aide such as a polysiloxane, where the polysiloxane can comprise an ultrahigh molecular weight polysiloxane with a kinematic viscosity of larger than 10×10$^6$ centistokes (cSt) determined in accordance with ASTM D445 Kinematic Viscosity. The polysiloxane can be added to the composition as a polymer dispersion, where the polysiloxane is dispersed in a polymer matrix, for example, in polypropylene. The polypropylene matrix can comprise the above mentioned polypropylene, specifically, the polypropylene matrix can comprise a polypropylene homopolymer. The siloxane content of the dispersion can be 40 to 60 wt %, for example about 50 wt %, based on the total weight of the dispersion. As used herein, the siloxane comprises polydimethyl siloxane or functionalized polydimethyl siloxane. An example of such a polysiloxane processing aide is MB50-001 Masterbatch, commercially available from Dow Corning™. The processing aide can be present in an amount of 0.2 to 10 wt %, specifically, 0.2 to 5 wt %, more specifically, less than or equal to 1 wt %, even more specifically, less than or equal to 0.5 wt %, based on the total weight of the composition.

The composition can comprise 0.1 to 1 wt % of oleamide and/or erucamide based on the total weight of the composition. Oleamide and erucamide are the amides of fatty acids oleic acid and erucic acid, and have molecular formula $C_{18}H_{35}NO$ and $C_{22}H_{43}NO$, respectively. Such an amount of fatty acid amide can decrease the visibility of surface damage like scratches on a molded article. Accordingly, the amount of fatty acid amide can be less than or equal to 1 wt %, specifically, 0.1 to 0.6 wt % based on the total weight of the composition. Compositions comprising greater than 1 wt %, specifically, greater than or equal to 1.5 wt % can experience excessive migration of the compound to the surface of the molded article and cause problems like stickiness etc.

Specifically mentioned other optional additives include colorant such as carbon black or pigments. The colorant can be present in an amount of 0.1 to 5 wt %, specifically, 0.5 to 4 wt % based on the total weight of the composition.

Stabilizers including, for example, a UV stabilizer, a visible light stabilizer, a thermal stabilizer, an antioxidant, or a combination comprising at least one of the foregoing can be present in an amount of 0.1 to 2 wt %, specifically, 0.2 to 1 wt %, more specifically, 0.3 to 0.8 wt % based on the total weight of the composition.

The composition can be made by, for example, mixing all of the components in an extruder, to obtain the composition of pellet or granule form or the composition can be formed by mixing all of the components minus the glass filler in an extruder, to obtain the composition of pellet or granule form and subsequently mixing in the glass filler. The composition can also be made by blending different pellets of different compositions. The composition prior to the addition of the glass filler can have a melt flow index of 0.1 to 100 g/10 min, specifically, 10 to 40 g/10 min as measured in accordance with ISO 1133 using a 2.16 kg weight at a temperature of 230° C.

An article made from the composition can have a notched Izod impact value as determined according to ISO 180/4A (2000) as measured at 23° C. of greater than or equal to 25 kilojoules per meter squared ($kJ/m^2$), specifically, greater than or equal to 30 $kJ/m^2$ (parallel) and/or of greater than or equal to 20 $kJ/m^2$, specifically, greater than or equal to 29 $kJ/m^2$ (perpendicular).

An article made from the composition can have a parallel notched Izod impact value as determined according to ISO 180/1A (2000) of greater than or equal to 20 $kJ/m^2$, specifically, greater than or equal to 28 $kJ/m^2$ as measured at 23° C. and/or of greater than or equal to 15 $kJ/m^2$, specifically, greater than or equal to 20 $kJ/m^2$ as measured at 0° C. and/or of greater than or equal to 8 $kJ/m^2$, specifically, greater than or equal to 12 $kJ/m^2$ as measured at −20° C.

An article made from the composition can have a flexural modulus as determined according to the American Society for Testing and Materials (ASTM) D790 Procedure B measured at 23° C. of (parallel) of greater than or equal to 1000 Newtons per millimeter squared ($N/mm^2$), specifically, greater than or equal to 1800 $N/mm^2$ and/or of greater than or equal to 800 $N/mm^2$, specifically, greater than or equal to 1000 $N/mm^2$ (perpendicular). Sample dimensions for determining flexural moduli were 65×12.7×3.2 mm with a support span L of 51 mm.

An article made from the composition can have a gloss measurements as determined according to ISO 2813 taken at 23° C. of less than or equal to 20, specifically, less than or equal to 10 as determined at an angle of 20 degrees and/or lower than or equal to 45, specifically, less than or equal to 30 as determined at an angle of 60 degrees and/or less than or equal to 75, specifically, less than or equal to 60 as determined at an angle of 85 degrees.

An article made from the composition with a Volkswagen (VW) texture K59 can have a VW scratch resistance value as measured according to PV 3952 2002 scratch method of VW AG company on an Erichsen scratching device with a load 10 Newton (N) of a dL of less than 1.5, specifically, less than or equal to 0.5.

An article molded from the composition can be used in applications where aesthetic aspects (such as visible and/or tactile aspects are important). Such applications can be used as parts for automotive exterior and interior applications, or electrical appliances. Examples of automotive parts include bumper fascia, instrument panels, consoles, interior trim parts, door panels, door grips (e.g., interior), shift boot, and dash board.

The following examples are provided to illustrate the soft touch composition. The examples are merely illustrative and are not intended to limit devices made in accordance with the disclosure to the materials, conditions, or process parameters set forth therein.

EXAMPLES

The following examples are provided to illustrate the soft touch compositions of the present disclosure. The examples are merely illustrative and are not intended to limit devices made in accordance with the disclosure to the materials, conditions, or process parameters set forth therein.

The melt flow index (MFI) was determined according to the International Organization for Standardization (ISO) test standards ISO 1133 at 230° C. under a load of 2.16 kilogram (kg).

The ash content was determined according to ISO 3451 measured after 15 minutes (min) at 525° C.

Notched Izod impact values were determined according to ISO 180/1A. Notched Izod impact parallel and perpendicular measurements were obtained at 23° C. according to ISO180/4A and at −20° C. according to ISO180/4A.

The flexural modulus and the flexural strength were determined at 23° C. according to the ASTM D790 Procedure B and according to ISO 178. ASTM D790 parallel and perpendicular measurements were done on 65×12.7×3.2 mm cut samples and ISO 178 measured on 80×10×4 mm molded bars.

Tensile properties were measured according to ISO 527/1A at 23° C.

Gloss measurements were determined according to ISO 2813 at 23° C.

Shrinkage measurements were determined according to ISO 294-4 (Apr. 23, 1990). The sample size used was 65×65×3.2 mm with measurements taken 24 h at 23° C. after molding and after 1 h at 90° C. Parallel shrinkage indicated is parallel to the flow direction, perpendicular is the shrinkage in cross flow direction. Shrinkage was measured on 5 samples and averaged.

Warpage measurements were determined by the ratio of shrinkage in the parallel and perpendicular direction. The temperature and time held at said temperature are listed in Table 3 for each test.

The Volkswagen (VW) scratch resistance test was measured according to PV 3952 2002 scratch method of VW AG company on an Erichsen scratching device with a load 10 Newton (N). The resulting value, dL, is a measure for the scratch resistance, where a low dL value corresponds to high scratch resistance and means that the scratch does not turn white but keeps the original color or the scratched plaque. In order to pass this test, the dL should be less than 1.5, specifically, less than or equal to 0.5.

Hardness measurements were ball indentation hardness measurements as determined according to ISO 2039 Part 1 at a temperature of 23° C., a force of 132 Newtons for 30 seconds.

Friction measurements were determined according to ISO 8295 with loads adapted to 130 N for 35 seconds.

The materials used in the Examples are described in Table 1. Amounts of components are in wt %, unless otherwise indicated.

TABLE 1

| Component | Description | Source |
|---|---|---|
| PP1 | A heterophasic polymer comprising 18.5 wt % of ethylene-propylene copolymer dispersed in a polypropylene homopolymer, wherein the polypropylene homopolymer has a MFI of 70 measured at 230° C. under a load of 2.16 kg according to ISO 1133, and a cold xylene soluble fraction of the ethylene-propylene copolymer has an intrinsic viscosity of 2.2 dl/g measured in decalin at 135° C. | SABIC's Innovative Plastics business |
| PP2 | A heterophasic polymer comprising 24 wt % of ethylene-propylene copolymer dispersed in a polypropylene homopolymer wherein the polypropylene homopolymer has a MFI of 50 measured at 230° C. under a load of 2.16 kg according to ISO 1133, and a cold xylene soluble fraction of the ethylene-propylene copolymer has an intrinsic viscosity of 3.0 dl/g measured in decalin at 135° C. | SABIC's Innovative Plastics business |
| PP3 | A heterophasic polymer comprising 33 wt % of ethylene-propylene copolymer dispersed in a polypropylene homopolymer wherein the polypropylene homopolymer has a MFI of 50 measured at 230° C. under a load of 2.16 kg according to ISO 1133, and a cold xylene soluble fraction of the ethylene-propylene copolymer has an intrinsic viscosity of 1.7 dl/g measured in decalin at 135° C. | SABIC's Innovative Plastics business |
| PP4 | A heterophasic polymer comprising 10 wt % of ethylene-propylene copolymer dispersed in a polypropylene homopolymer wherein the polypropylene homopolymer has a MFI of 150 measured at 230° C. under a load of 2.16 kg according to ISO 1133, and a cold xylene soluble fraction of the ethylene-propylene copolymer has an intrinsic viscosity of 7.0 dl/g measured in decalin at 135° C. | SABIC's Innovative Plastics business |
| Alpha-olefin | Ethylene-octene copolymer having a MFI of 5.0 decigrams per minute (dg/min) measured at 190° C. under a load of 2.16 kg according to ASTM D 1238 | Dow ™ Chemical Company |
| Talc | Talc Filler, D50 1.4, micrometer D987.0 micrometer as measured on Sedigraph 5120. | Imi Fabi |
| GF1 | Glass fibers, 10 to 20 micrometer diameter, 4 mm long | Johns Manville |
| GF2 | Glass fibers, 10 micrometer diameter, 4.5 mm long | Chongqing Polycomp International Corporation |
| GF3 | 60 wt % of glass fibers in PP. Glass fibers, 10 to 20 micrometer diameter 12.5 mm long | SABIC's Innovative Plastics business |
| GF4 | 40 wt % glass fibers in PP. Glass fibers, 13 micrometer diameter, 4.5 mm long with a total MFI of 15 (ISO1133, 2.16 kg, 230° C.) | SABIC's Innovative Plastics business |
| Coupling Agent | Maleic anhydride (MAh) functionalized homopolypropylene produced by reactive extrusion. MAh level 0.5 to 1 wt %, MFI 100-120 [g/10 min] 190° C./1.2 kg | Exxon Mobile Chemical |
| Tospearl 120FL | Silicone Particles (methylsilsequioxane), 2.0 micrometer average diameter | Momentive Performance Materials Japan LLC |
| Tospearl 2000B | Silicone Particles (methylsilsequioxane), 6.0 micrometer average diameter | Momentive Performance Materials Japan LLC |

TABLE 1-continued

| Component | Description | Source |
|---|---|---|
| PDMS master batch (MB50-001) | 50% of an ultrahigh molecular weight polydimethylsiloxane polymer dispersed in a polypropylene homopolymer | Dow Corning ™ |
| Stabilizer 1 (IRGANOX ™ B225, ANOX ™ B011, or EVERNOX ™ B110) | 50% Tetrakis[methylene(3,5-di-tert-butyl-4-hydroxyhydrocinnamate)] Methane and 50% Tris (2,4-di-tert-butylphenyl) phosphite | BASF, Chemtura or Everspring Chemical |
| Stabilizer 2 (IRGAFOS ™ 168, ALKANOX ™ 240, or EVERFOS ™ 168 | Tris (2,4-di-tert-butylphenyl)phosphite | BASF, Chemtura, or Everspring Chemical Company |
| Stabilizer 3 (ARENOX ™ DS, IRGANOX, or LOWINOX ™ DSTDP) | Propanoic acid, 3,3'-thiobis-, dioctadecyl ester | Reagens, BASF, or Chemtura |
| Stabilizer 4 (Chimassorb ™ 944 FD or Sabostab UV 94) | Hindered amine light stabilizer, poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) | Ciba Specialty Chemicals or SABO |
| Slip agent (Crodamide ORX Microbead) | Fatty acid amide, Oleamide | CRODA Polymers |
| Colorant | Carbon black or pigments master batch | Ferro, PolyOne, Clariant |

Examples 1-6

The components as recited in Table 2 for Compositions A and B were mixed together and injected molded using a standard machine equipped with a three-zone screw typically used for mineral filled polypropylene compounds at a temperature of 240° C. The melt flow index and the ash content were determined for Compositions A and B and are shown in Table 2.

TABLE 2

|  | Composition | |
|---|---|---|
|  | A | B |
| PP3 (wt %) | 74.95 | — |
| PP2 (wt %) | — | 64.95 |
| Alpha-olefin (wt %) | 20 | 30 |
| Talc (wt %) | 0.5 | 0.5 |
| Stabilizer 1 (wt %) | 0.2 | 0.2 |
| PDMS master batch (wt %) | 1 | 1 |
| Stabilizer 3 (wt %) | 0.1 | 0.1 |
| Slip agent (wt %) | 0.1 | 0.1 |
| Stabilizer 4 (wt %) | 0.15 | 0.15 |
| Colorant 1 (wt %) | — | 3 |
| Colorant (wt %) | 3 | — |
| Total (wt %) | 100 | 100 |
| Mechanical Properties | | |
| MFI (g/10 min) | 13.3 | 11.1 |
| MVI (mL/10 min) | 17.8 | 14.6 |
| Ash content (wt %) | 2.1 | 1.9 |

The compositions of Examples 1-6 were prepared by mixing one of Compositions A and B with glass fibers as shown in Table 3. The mechanical properties were determined and are also shown in Table 3.

TABLE 3

|  | Example | | | | | |
|---|---|---|---|---|---|---|
|  | 1 | 2 | 3 | 4 | 5 | 6 |
| Composition | A | A | B | B | A | B |
| Composition (wt %) | 85 | 70 | 85 | 70 | 77.5 | 77.5 |
| GF3 (wt %) | 15 | 30 | 15 | 30 | — | — |
| GF4 (wt %) | — | — | — | — | 22.5 | 22.5 |
| Total (wt %) | 100 | 100 | 100 | 100 | 100 | 100 |
| Mechanical Properties | | | | | | |
| Notched Izod impact at 23° C. | | | | | | |
| Izod impact (kJ/m$^2$) | 35.3 | 31.8 | 36.0 | 34.7 | 28.5 | 29.4 |
| Izod impact S.D. (kJ/m$^2$) | 2.0 | 2.4 | 1.7 | 1.2 | 1.5 | 2.3 |

TABLE 3-continued

|  | Example | | | | | |
|---|---|---|---|---|---|---|
|  | 1 | 2 | 3 | 4 | 5 | 6 |
| Notched Izod impact at −20° C. | | | | | | |
| Izod impact (kJ/m$^2$) | 11.3 | 10.6 | 12.0 | 11.6 | 9.2 | 10.3 |
| Izod impact S.D. (kJ/m$^2$) | 1.6 | 0.3 | 1.2 | 1.1 | 0.4 | 0.5 |
| Flexural modulus parallel (N/mm$^2$) | 1022 | 1651 | 1163 | 1442 | 1344 | 1269 |
| Flexural modulus St. Dev. (N/mm$^2$) | 26.7 | 37.9 | 29.4 | 34.7 | 34.5 | 32.8 |
| Flexural modulus, perpendicular (N/mm$^2$) | 842 | 1192 | 875 | 986 | 1031 | 957 |
| Flexural modulus St. Dev. (N/mm$^2$) | 23.5 | 31.1 | 24.3 | 27 | 28.9 | 26.8 |
| Gloss values at 23° C. | | | | | | |
| Gloss 20° | 34 | 29 | 49 | 41 | 31 | 48 |
| Gloss 60° | 60 | 56 | 73 | 68 | 56 | 71 |
| Gloss 85° | 89 | 84 | 92 | 89 | 88 | 92 |
| Shrinkage Measurements | | | | | | |
| Average shrinkage after 24 hr at 23° C. (%) | 0.56 | 0.52 | 0.48 | 0.48 | 0.63 | 0.57 |
| Average shrinkage after 24 hr at 23° C. and 1 hr at 90° C. (%) | 0.64 | 0.58 | 0.56 | 0.53 | 0.70 | 0.63 |
| Parallel shrinkage after 24 hr at 23° C. (%) | 0.42 | 0.35 | 0.35 | 0.34 | 0.48 | 0.43 |
| Perpendicular shrinkage after 24 hr at 23° C. (%) | 0.70 | 0.70 | 0.61 | 0.62 | 0.77 | 0.70 |
| Parallel shrinkage after 24 hr at 23° C. and 1 hr at 90° C. (%) | 0.48 | 0.38 | 0.42 | 0.37 | 0.53 | 0.47 |
| Perpendicular shrinkage after 24 hr at 23° C. and 1 hr at 90° C. (%) | 0.80 | 0.77 | 0.70 | 0.68 | 0.87 | 0.78 |
| Warpage, Scratch, and Haptic properties | | | | | | |
| Warpage after 24 hr at 23° C. | 1.67 | 2.01 | 1.72 | 1.81 | 1.61 | 1.63 |
| Warpage after 24 hr at 23° C. and 1 hr at 90° C. | 1.68 | 2.00 | 1.66 | 1.83 | 1.64 | 1.63 |
| Erichsen Scratch, dL | −0.19 | 0.04 | 0.15 | 0.34 | −0.09 | 0.23 |
| Soft Touch Panel SABIC Internal 2011 (12 persons)* | 2 | 4 | 1 | 4 | 4 | 4 |

*Soft touch panel ranked materials 1 to 5 (1 = soft, 5 = hard)

Table 3 shows that all of Examples 1-6 resulted in compositions with good notched Izod impact strength at 23° C. of greater than 20 kJ/m$^2$, specifically, greater than 29 kJ/m$^2$. Table 3 further shows that Example 4 exhibits good flexural strength of greater than 1400 MPa and Examples 1, 2, and 5 exhibit good gloss values of less than 50 at 60°.

Examples 7-18

Examples 7-18 were prepared by mixing the components as recited in Table 4 together and injection molding the mixture using a standard machine equipped with a three-zone screw typically used for mineral filled polypropylene compounds at a temperature of 200° C. Examples 9-13 and 16-18 comprise Tospearl silicone particles, whereas Examples 7, 8, and 14 and 15 do not. The melt flow index, the melt volume index, and the ash content were determined and are also shown in Table 4.

TABLE 4

|  | Example | | | | | | | | | | | |
|---|---|---|---|---|---|---|---|---|---|---|---|---|
|  | 7 | 8 | 9 | 10 | 11 | 12 | 13 | 14 | 15 | 16 | 17 | 18 |
| PP1 | — | 10 | 10 | 10 | 10 | 10 | 10 | 10 | 10 | 10 | — | 39.4 |
| PP2 | 44.9 | 32.9 | 36.9 | 36.9 | 32.9 | 32.9 | 31.4 | 32.4 | 29.9 | 31.4 | — | — |
| PP4 | — | — | — | — | — | — | — | — | — | — | 35.4 | — |
| Alpha-olefin | 30 | 30 | 25 | 25 | 25 | 25 | 25 | 25 | 25 | 25 | 31 | 27 |
| Talc | 0.5 | 0.5 | 0.5 | 0.5 | 0.5 | 0.5 | 0.5 | 0.5 | 0.5 | 0.5 | 0.5 | 0.5 |
| GF1 | 20 | 20 | — | — | — | — | — | — | — | — | — | — |
| GF2 | — | — | 20 | 20 | 20 | 20 | 25 | 25 | 25 | 25 | 25 | 25 |
| Coupling agent | — | 2 | 2 | 2 | 2 | 2 | 2.5 | 2.5 | 5 | 2.5 | 2.5 | 2.5 |

TABLE 4-continued

|  | Example | | | | | | | | | | | |
| --- | --- | --- | --- | --- | --- | --- | --- | --- | --- | --- | --- | --- |
|  | 7 | 8 | 9 | 10 | 11 | 12 | 13 | 14 | 15 | 16 | 17 | 18 |
| PDMS master batch | 1 | 1 | 1 | 1 | 1 | 1 | 1 | 1 | 1 | 1 | 1 | 1 |
| Slip agent | 0.1 | 0.1 | 0.1 | 0.1 | 0.1 | 0.1 | 0.1 | 0.1 | 0.1 | 0.1 | 0.1 | 0.1 |
| Stabilizer 1 | 0.1 | 0.1 | 0.1 | 0.1 | 0.1 | 0.1 | 0.1 | 0.1 | 0.1 | 0.1 | 0.1 | 0.1 |
| Stabilizer 2 | 0.1 | 0.1 | 0.1 | 0.1 | 0.1 | 0.1 | 0.1 | 0.1 | 0.1 | 0.1 | 0.1 | 0.1 |
| Stabilizer 3 | 0.1 | 0.1 | 0.1 | 0.1 | 0.1 | 0.1 | 0.1 | 0.1 | 0.1 | 0.1 | 0.1 | 0.1 |
| Stabilizer 4 | 0.2 | 0.2 | 0.2 | 0.2 | 0.2 | 0.2 | 0.2 | 0.2 | 0.2 | 0.2 | 0.2 | 0.2 |
| Tospearl 120 FL | — | — | — | 1 | — | 5 | — | — | — | — | — | — |
| Tospearl 2000B | — | — | 1 | — | 5 | — | 1 | — | — | 1 | 1 | 1 |
| Colorant | 3 | 3 | 3 | 3 | 3 | 3 | 3 | 3 | 3 | 3 | 3 | 3 |
| Total (wt %) | 100 | 100 | 100 | 100 | 100 | 100 | 100 | 100 | 100 | 100 | 100 | 100 |
| Properties | | | | | | | | | | | | |
| MFI (g/10 min) | 6.12 | 9.44 | 9.49 | 9.07 | 9.03 | 7.74 | 8.33 | 10.3 | 12.5 | 6.74 | 15.6 | 12.5 |
| MVI (mL/10 min) | 7.10 | 11.3 | 10.6 | 10.0 | 10.0 | 8.79 | 9.08 | 11.9 | 13.9 | 7.96 | 17.4 | 14 |
| Ash content (wt %) | 21.5 | 21.4 | 22 | 21.5 | 25.6 | 25.4 | 28.2 | 26.3 | 26.1 | 27.0 | 26.8 | 27.6 |

Table 4 shows that the presence of the silicone particles does not reduce the melt flow properties or increase the ash content.

Notched Izod Properties

The notched Izod impact properties of Examples 7-15 were determined and are shown in the below Table 5.

TABLE 5

|  | Example | | | | | | | | |
| --- | --- | --- | --- | --- | --- | --- | --- | --- | --- |
|  | 7 | 8 | 9 | 10 | 11 | 12 | 13 | 14 | 15 |
| Notched Izod impact at 23° C. (Parallel) (ISO 180/4A) | | | | | | | | | |
| Izod impact (kJ/m$^2$) | 21.47 | 35.38 | — | — | — | — | 32.33 | 33.51 | 33.43 |
| Izod Impact S.D. (kJ/m$^2$) | 0.99 | 2.49 | — | — | — | — | 2.5 | 3.14 | 2.34 |
| Notched Izod impact at 23° C. (Perpendicular) (ISO 180/4A) | | | | | | | | | |
| Izod impact (kJ/m$^2$) | 18.89 | 32.53 | — | — | — | — | 29.68 | 30.52 | 30.78 |
| Izod Impact S.D. (kJ/m$^2$) | 0.68 | 1.4 | — | — | — | — | 1.72 | 1.19 | 1.27 |
| Notched Izod impact at 23° C. (Parallel) (ISO 180/1A) | | | | | | | | | |
| Izod impact (kJ/m$^2$) | 18.73 | 33.31 | 30.36 | 28.44 | 28.11 | 28.81 | 30.84 | 32.00 | 30.47 |
| Izod Impact S.D. (kJ/m$^2$) | 0.44 | 0.9 | 0.69 | 1.03 | 0.65 | 1.06 | 0.97 | 1.09 | 1.13 |

TABLE 5-continued

|  | Example | | | | | | | | |
| --- | --- | --- | --- | --- | --- | --- | --- | --- | --- |
|  | 7 | 8 | 9 | 10 | 11 | 12 | 13 | 14 | 15 |
| Notched Izod impact at 0° C. (Parallel) (ISO 180/1A) | | | | | | | | | |
| Izod impact (kJ/m$^2$) | 14.24 | 28.68 | 24.73 | 23.71 | 21.95 | 23.25 | 25.56 | — | — |
| Izod Impact S.D. (kJ/m$^2$) | 0.21 | 1.38 | 0.48 | 0.55 | 0.81 | 1.43 | 1.02 | — | — |
| Notched Izod impact at −20° C. (Parallel) (ISO 180/1A) | | | | | | | | | |
| Izod impact (kJ/m$^2$) | 8.88 | 16.22 | 15.16 | 14.23 | 12.67 | 13.78 | 15.19 | 13.06 | 12.09 |
| Izod Impact S.D. (kJ/m$^2$) | 0.32 | 1.34 | 0.34 | 0.98 | 0.65 | 0.67 | 0.42 | 0.63 | 0.34 |

Table 5 shows that adding a coupling agent can result in an increase in mechanical properties, where all of Examples 8-15 display increased notched Izod impact properties as compared to Example 7. Examples 9-13 further show that compositions comprising the silicone particles are able to maintain comparable notched Izod impact properties as compared to compositions that do not comprise the silicone particles (see Examples 8, 14, and 15).

Flexural and Tensile Properties

The flexural and tensile properties of Examples 7-15 were determined and are shown below in Tables 6 and 7, respectively.

TABLE 6

| | 7 | 8 | 9 | 10 | 11 | 12 | 13 | 14 | 15 |
|---|---|---|---|---|---|---|---|---|---|
| Flexural Properties, ASTM D790, Parallel | | | | | | | | | |
| Flexural modulus (N/mm$^2$) | 1180 | 1302 | 1467 | 1572 | 1592 | 1574 | 1842 | 1894 | 1977 |
| Flexural modulus, St. Dev. (N/mm$^2$) | 73 | 60 | 74 | 57 | 61 | 67 | 92 | 105 | 122 |
| Flexural strength, (N/mm$^2$) | 26 | 27.9 | 31.3 | 33.4 | 33.3 | 33.1 | 37.7 | 37.8 | 39.6 |
| Flexural strength, St. Dev. (N/mm$^2$) | 1.2 | 1 | 1.2 | 0.8 | 0.8 | 1 | 1.3 | 1.6 | 1.8 |
| Flexural Properties, ASTM D790, Perpendicular | | | | | | | | | |
| Flexural modulus (N/mm$^2$) | 772 | 756 | 892 | 962 | 933 | 936 | 1028 | 1026 | 1065 |
| Flexural modulus, St. Dev. (N/mm$^2$) | 55 | 60 | 47 | 46 | 44 | 59 | 74 | 58 | 63 |
| Flexural strength, (N/mm$^2$) | 19.6 | 19.2 | 22.5 | 24.3 | 23.9 | 23.70 | 25.5 | 25.1 | 26.1 |
| Flexural strength, St. Dev. (N/mm$^2$) | 1 | 1.1 | 0.9 | 1 | 0.9 | 0.9 | 1.1 | 1.4 | 1.2 |
| Flexural Properties, ISO 178, Parallel | | | | | | | | | |
| Flexural modulus (N/mm$^2$) | 1761 | 1815 | 1860 | 2151 | 1997 | 1934 | 2853 | 2870 | 2993 |
| Flexural modulus, St. Dev. (N/mm$^2$) | 27 | 43 | 75 | 28 | 19 | 60 | 24 | 19 | 28 |
| Flexural strength, (N/mm$^2$) | 29.1 | 28.4 | 30.5 | 35.1 | 32 | 31.8 | 40.1 | 40.8 | 42.9 |
| Flexural strength, St. Dev. (N/mm$^2$) | 0.2 | 1 | 0.3 | 0.2 | 0.2 | 0.2 | 0.3 | 0.2 | 0.5 |

Tables 6 (above) and 7 (below) show that the presence of the silicone particles surprisingly results in an increase in flexural and tensile properties, where Examples 9-12 and 16-18 all show increase flexural moduli, flexural strength, and tensile moduli values as compared to Example 8 that comprises a corresponding amount of coupling agent, but does not comprise the silicone particles. A comparison of Example 13 to Example 9 shows that increasing the amount of coupling agent can further increase the flexural properties and the tensile modulus in the soft touch compositions.

Gloss Properties

The gloss properties of Examples 7-15 were determined and are shown in the below Table 8.

Table 8 shows that adding silicone particles results in a decrease in gloss properties, where Examples 8, 9, and 11 and Examples 10 and 12 that have increasing amounts of silicone particles all show reducing gloss values at both particles sizes.

TABLE 7

| | 7 | 8 | 9 | 10 | 11 | 12 | 13 | 14 | 15 | 16 | 17 | 18 |
|---|---|---|---|---|---|---|---|---|---|---|---|---|
| Tensile modulus (N/mm$^2$) | 1810 | 1873 | 2009 | 2200 | 2233 | 2205 | 2743 | 2693 | 2836 | 2552 | 2717 | 2790 |
| Tensile modulus St. Dev. (N/mm$^2$) | 62 | 40.7 | 102.5 | 28.1 | 28.1 | 16.4 | 15.1 | 33 | 20 | 28.7 | 17.6 | 14.3 |
| Elongation at break (%) | 9.9 | 13.2 | 12.4 | 11 | 10.6 | 11.6 | 10.5 | 6.8 | 7.1 | 9.7 | 12.7 | 9.4 |
| Elongation at break St. Dev. (%) | 0.6 | 1.1 | 0.9 | 0.3 | 0.9 | 0.5 | 1 | 0.6 | 0.3 | 0.3 | 0.4 | 0.5 |
| Elongation at yield (%) | 6.5 | 8.6 | 8.5 | 8 | 7.7 | 8.1 | 8.1 | 5.9 | 6.1 | 7.4 | 10.7 | 7.2 |
| Elongation at yield St. Dev. (%) | 0.1 | 0.1 | 0.1 | 0 | 0.1 | 0.1 | 1 | 0.4 | 0.2 | 0.1 | 0.1 | 0.1 |
| Stress at break (N/mm$^2$) | 15.7 | 20.1 | 23.7 | 25.8 | 24.8 | 24.6 | 29.2 | 28.5 | 29.8 | 28.0 | 33.5 | 29.0 |
| Stress at break St. Dev. (N/mm$^2$) | 0.2 | 0.8 | 1.1 | 0.5 | 0.8 | 0.4 | 0.5 | 0.2 | 0.2 | 0.6 | 1.3 | 0.2 |
| Tensile strength (N/mm$^2$) | 23.6 | 24.7 | 27.4 | 28.6 | 27.5 | 27.8 | 32 | 30.6 | 32.3 | 31.4 | 36.4 | 32.9 |
| Tensile strength St. Dev. (N/mm$^2$) | 0.3 | 0.1 | 0.4 | 0.1 | 0.3 | 0.3 | 0.3 | 0.3 | 0.1 | 0.2 | 0.1 | 0.2 |
| Yield strength (N/mm$^2$) | 23.6 | 24.7 | 27.4 | 28.6 | 27.5 | 27.8 | 32 | 30.6 | 32.3 | 31.4 | 36.4 | 32.9 |
| Yield strength St. Dev. (N/mm$^2$) | 0.3 | 0.1 | 0.4 | 0.1 | 0.3 | 0.3 | 0.3 | 0.3 | 0.1 | 0.2 | 0.1 | 0.2 |

TABLE 8

| | 7 | 8 | 9 | 10 | 11 | 12 | 13 | 14 | 15 |
|---|---|---|---|---|---|---|---|---|---|
| Gloss 20° | 16.2 | 22.4 | 15.0 | 15.32 | 13.56 | 13.8 | 10.2 | 12.7 | 15.9 |

TABLE 8-continued

| | 7 | 8 | 9 | 10 | 11 | 12 | 13 | 14 | 15 |
|---|---|---|---|---|---|---|---|---|---|
| Gloss 20° St Dev. | 0.8 | 1.0 | 0.8 | 0.64 | 0.23 | 0.7 | 0.1 | 0.27 | 0.86 |
| Gloss 60° | 49.1 | 51.1 | 39.6 | 40.14 | 36.28 | 36.8 | 29.2 | 40.3 | 42.8 |
| Gloss 60° St Dev. | 1.5 | 1.0 | 2.3 | 1.08 | 0.35 | 1.2 | 0.3 | 0.58 | 1.52 |
| Gloss 85° | 78.7 | 78.0 | 67.2 | 66.28 | 67.54 | 66.9 | 59.1 | 70.9 | 71.8 |
| Gloss 85° St Dev. | 1.2 | 0.8 | 3.8 | 1.44 | 0.71 | 0.6 | 0.5 | 1.01 | 1.53 |

Shrinkage Properties

The shrinkage and warpage properties of Examples 7-12, 14, and 15 were determined and are shown in the below Table 9.

Table 9 shows that adding silicone particles results in an increase in shrinkage properties where Examples 9 and 10 all display increased shrinkage as compared to Example 8. Comparing Examples 10 and 12 to Examples 9 and 11, respectively, show that increasing the amount of silicone particles with a 6 micrometer particles size results in some increase in shrinkage (see Examples 9 and 11), whereas increasing the amount of silicone particles with a 2 micrometer particle size from 1 to 5 wt % resulted in little or no change in shrinkage values.

Table 9 also shows that adding silicone particles surprisingly results in a decrease in warpage, where Example 8 shows higher warpage values as compared to those of Examples 9-12. Table 9 further shows that increasing the diameter from 2 to 6 micrometers and concentration from 1 to 5 weight percent of the siloxane particles results in an increase in warpage.

Surface Properties

The surface properties including Erichsen scratch, ball indentation hardness, and the coefficients of static and dynamic friction of Examples 7-18 were determined and are shown Table 10 below.

Table 10 shows that the examples display good Erichsen scratch data with dL values of less than 1.5. Table 10 also shows that Examples 10-12 and 16-18 comprising silicone particles result in decreased coefficients of static and dynamic friction.

Haptic Properties

Examples 16-19 were prepared as above-described for Examples 7-15. Their compositions are described in Table 11. The haptic properties of Examples 8, 10, 13, and 16-19 were determined by a panel of 7 to 13 experts in material properties. Specifically, the experts felt the surface of the respective compositions and assigned it a haptic rating of 1 to 5, where a haptic rating of 1 was the best and 5 was the worst. The averages of the ratings for each surface was determined and are shown in Table 11, where it is noted that Examples 10 and 18 are the same compositions except for the injection speeds of 30 and 60 mm/s, respectfully.

TABLE 9

| | 7 | 8 | 9 | 10 | 11 | 12 | 14 | 15 |
|---|---|---|---|---|---|---|---|---|
| Average shrinkage after 24 hr at 23° C. (%) | 0.33 | 0.39 | 0.45 | 0.49 | 0.50 | 0.49 | 0.48 | 0.49 |
| Average shrinkage after 24 hr at 23° C. and 1 hr at 90° C. (%) | 0.36 | 0.45 | 0.52 | 0.58 | 0.56 | 0.57 | 0.57 | 0.57 |
| Parallel shrinkage after 24 hr at 23° C. (%) | 0.18 | 0.18 | 0.26 | 0.31 | 0.27 | 0.28 | 0.26 | 0.23 |
| Perpendicular shrinkage after 24 hr at 23° C. (%) | 0.49 | 0.59 | 0.63 | 0.68 | 0.72 | 0.71 | 0.71 | 0.74 |
| Parallel shrinkage after 24 hr at 23° C. and 1 hr at 90° C. (%) | 0.19 | 0.21 | 0.29 | 0.35 | 0.30 | 0.34 | 0.30 | 0.26 |
| Perpendicular shrinkage after 24 hr at 23° C. and 1 hr at 90° C. (%) | 0.54 | 0.69 | 0.74 | 0.80 | 0.81 | 0.80 | 0.83 | 0.88 |
| Warpage after 24 hr at 23° C. | 2.74 | 3.30 | 2.41 | 2.23 | 2.63 | 2.56 | 2.68 | 3.19 |
| Warpage after 24 hr at 23° C. and 1 hr at 90° C. | 2.83 | 3.28 | 2.59 | 2.27 | 2.65 | 2.35 | 2.72 | 3.33 |

TABLE 10

| | 7 | 8 | 9 | 10 | 11 | 12 | 13 | 14 | 15 | 16 | 17 | 18 |
|---|---|---|---|---|---|---|---|---|---|---|---|---|
| Erichsen Scratch, 10N, dL | 0.11 | −0.09 | −0.08 | −0.07 | 0.06 | 0.01 | 0.14 | 0.30 | 0.10 | — | — | — |
| Erichsen Scratch, 12.5N, dL | −0.11 | −0.06 | — | — | — | — | — | — | — | — | — | — |
| Erichsen Scratch, 15N, dL | −0.49 | −0.28 | — | — | — | — | — | — | — | — | — | — |
| Hardness (N/mm$^2$) | — | — | — | — | — | — | 36.10 | 36.20 | 34.80 | 33.3 | 35.0 | 35.1 |
| Hardness, St. Dev. (N/mm$^2$) | — | — | — | — | — | — | 0.80 | 1.40 | 1.90 | 1.20 | 2.00 | 1.90 |
| Coefficient of static friction | 0.36 | 0.38 | — | 0.34 | 0.25 | 0.32 | 0.31 | 0.37 | 0.27 | 0.30 | 0.26 | 0.23 |
| Coefficient of static friction, St. Dev. | 0.03 | 0.04 | — | 0.01 | 0.03 | 0.01 | 0.02 | 0.08 | 0.06 | 0.03 | 0.04 | 0.03 |
| Coefficient of dynamic friction | 0.26 | 0.26 | — | 0.22 | 0.18 | 0.23 | 0.26 | 0.20 | 0.23 | 0.21 | 0.20 | 0.19 |
| Coefficient of dynamic friction, St. Dev. | 0.01 | 0.01 | — | 0.00 | 0.01 | 0.01 | 0.01 | 0.01 | 0.01 | 0.00 | 0.01 | 0.01 |

Table 11 shows that compositions comprising 6 micrometer silicone particles have the best haptic ratings of 1. Table 11 also shows that increasing the injection speed can result in a reduction in haptic properties, where Examples 10 and 18 were prepared with injection speeds of 30 and 60 mm/s, respectively, and resulted in haptic ratings of 2 and 3, respectively.

TABLE 11

| | Example | | | | | | |
|---|---|---|---|---|---|---|---|
| | 19 | 8 | 10 | 13 | 20 | 21 | 22 |
| PP1 | — | 10 | 10 | 10 | 10 | 10 | 10 |
| PP2 | 44.9 | 32.9 | 36.9 | 31.4 | 36.9 | 36.9 | 32.4 |
| Alpha-olefin | 30 | 30 | 25 | 25 | 25 | 25 | 25 |
| Talc | 0.5 | 0.5 | 0.5 | 0.5 | 0.5 | 0.5 | 0.5 |
| GF1 | 20 | 20 | — | — | — | — | — |
| GF2 | — | — | 20 | 25 | 20 | 20 | 25 |
| Coupling agent | — | 2 | 2 | 2.5 | 2 | 2 | 2.5 |
| PDMS master batch | 1 | 1 | 1 | 1 | 1 | 1 | 1 |
| Slip agent | 0.1 | 0.1 | 0.1 | 0.1 | 0.1 | 0.1 | 0.1 |
| Stabilizer 1 | 0.1 | 0.1 | 0.1 | 0.1 | 0.1 | 0.1 | 0.1 |
| Stabilizer 2 | 0.1 | 0.1 | 0.1 | 0.1 | 0.1 | 0.1 | 0.1 |
| Stabilizer 3 | 0.1 | 0.1 | 0.1 | 0.1 | 0.1 | 0.1 | 0.1 |
| Stabilizer 4 | 0.2 | 0.2 | 0.2 | 0.2 | 0.2 | 0.2 | 0.2 |
| Tospearl 120 FL | — | — | 1 | — | — | 1 | — |
| Tospearl 2000B | — | — | — | 1 | 1 | — | — |
| Colorant | 3 | 3 | 3 | 3 | 3 | 3 | 3 |
| Total (wt %) | 100 | 100 | 100 | 100 | 100 | 100 | 100 |
| Haptic Properties | | | | | | | |
| Haptic rating | 3 | 2 | 2 | 1 | 1 | 3 | 2 |

The haptic properties of Examples 16-18 were determined by a panel of 9 experts in soft touch properties. Specifically, the experts felt the surface of the respective compositions and assigned it a haptic rating of 1 to 3, where a haptic rating of 1 was the best and 3 was the worst. The averages of the ratings for each surface of Examples 16, 17, and 18 were 1.1, 2.5, and 2.4, respectfully.

Example 16 had excellent haptic properties. This could be due to the presence of a heterophasic polymer comprising greater than or equal to 20 wt % of ethylene-propylene copolymer dispersed in a polypropylene homopolymer with an MFI of less than or equal to 65 measured at 230° C. under a load of 2.16 kg according to ISO 1133, and a cold xylene soluble fraction of the ethylene-propylene copolymer has an intrinsic viscosity of 2.5 to 6.5 dl/g measured in decalin at 135° C.

Embodiment 1: a soft touch composition comprising, based on the total weight of the composition, 10 to 40 wt % of glass fibers; and 50 to 88 wt % of a polymer comprising, based on the total weight of the polymer, 44 to 52 wt % of a polypropylene homopolymer, 3 to 30 wt % of an ethylene-propylene copolymer, and 22 to 52 wt % of an ethylene-$C_4$ to $C_8$ alpha olefin copolymer.

Embodiment 2: the composition of Embodiment 1, wherein the polypropylene homopolymer has a melt flow index of 5 to 150 g/10 min measured at 230° C. under 2.16 kg force according to ISO 1133.

Embodiment 3: the composition of any of Embodiments 1-2, wherein a cold xylene soluble fraction of the ethylene-propylene copolymer has an intrinsic viscosity of 2 to 8 dl/g measured in decalin at 135° C.

Embodiment 4: the composition of any of Embodiments 1-3, wherein a cold xylene soluble fraction of the ethylene-propylene copolymer has an intrinsic viscosity of 3 to 8 dl/g measured in decalin at 135° C.

Embodiment 5: the composition of any of Embodiments 1-4, wherein the ethylene-$C_4$ to $C_8$ alpha olefin copolymer is polymerized from ethylene and at least one of 1-butene, 1-hexene, and 1-octene.

Embodiment 6: the composition of any of Embodiments 1-5, wherein the ethylene-$C_4$ to $C_8$ alpha olefin copolymer has a density of 850 to 880 kg/m$^3$ and a melt flow index of 0.5 to 35 g/10 min measured at 190° C. under 2.16 kg force according to ISO 1133.

Embodiment 7: the composition of any of Embodiments 1-6, wherein the glass fibers have a filament diameter of 10 to 20 micrometers.

Embodiment 8: the composition of any of Embodiments 1-7, further comprising a modified polypropylene, wherein a modified polypropylene is a polypropylene grafted with a carboxylic acid or salts thereof, an anhydride, an ester, or a combination comprising at least one of the foregoing.

Embodiment 9: the composition of Embodiment 8, wherein the modified polypropylene is a homopolypropylene grafted with maleic anhydride.

Embodiment 10: the composition of Embodiment 9, wherein a functional group derived from maleic anhydride is present in an amount of greater than or equal to 0.5 wt %, based on the total weight of the modified polypropylene.

Embodiment 11: the composition of Embodiment 8, wherein the modified polypropylene is present in an amount of 0.1 to 4 wt %, based on the total weight of the composition.

Embodiment 12: the composition of any of Embodiments 1-11, further comprising a silicone particle having the formula (I)

$$R_xSiO_{2-(x/2)}$$ 

wherein x is a positive number greater than or equal to 1, and each R is independently an aliphatic hydrocarbon group, an aromatic hydrocarbon, or an unsaturated group.

Embodiment 13: the composition of Embodiment 12, wherein the silicone particle comprises methylsilsequioxane.

Embodiment 14: the composition of any of Embodiments 12-13, wherein the silicone particle has a mean particle diameter of 1.8 to 10.5 micrometers.

Embodiment 15: the composition of any of Embodiments 12-14, wherein the silicone particle is present in an amount of 1 to 5 wt %, based on the total weight of the composition.

Embodiment 16: the composition of any of Embodiments 1-15, further comprising 0.1 to 5 wt % of a colorant.

Embodiment 17: the composition of any of Embodiments 1-16, further comprising a polysiloxane, wherein the polysiloxane comprises an ultra high molecular weight polysiloxane with a kinematic viscosity of greater than 10×10$^6$ centistokes as determined in accordance with ASTM D445.

Embodiment 18: the composition of Embodiment 17, wherein the ultra high molecular weight polysiloxane as added to the composition is dispersed in a second polypropylene homopolymer that is the same or different from the polypropylene homopolymer.

Embodiment 19: the composition of any of Embodiments 17-18, wherein the polysiloxane is present in an amount of 0.2 to 10 wt %.

Embodiment 20: the composition of any of Embodiments 1-19, wherein the composition further comprises 0.1 to 2 wt % of a thermal stabilizer, a UV stabilizer, a visible light stabilizer, an antioxidant, or a combination comprising one or more of the foregoing.

Embodiment 21: the composition of any of Embodiments 1-20, wherein the glass fibers have a length of 1 to 50 mm.

Embodiment 22: the composition of any of Embodiments 1-21, wherein the glass fibers have a length of 1 to 20 mm.

Embodiment 23: the composition of any of Embodiments 1-22, wherein the glass fibers have a length of 5 to 15 mm.

Embodiment 23: an article made from the composition of any of Embodiments 1-23.

Embodiment 24: the article of Embodiment 23, wherein the article is an automotive interior article.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This Application claims priority to U.S. Application Ser. No. 61/871,016 filed on Aug. 28, 2013 and to European Application Number EP13183137.2 filed on Sep. 5, 2013, the contents of both of which are incorporated in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A soft touch composition comprising, based on the total weight of the composition,
   10 to 40 wt % of glass fibers; and
   50 to 88 wt % of a polymer comprising, based on the total weight of the polymer,
     44 to 52 wt % of a polypropylene homopolymer,
     3 to 30 wt % of an ethylene-propylene copolymer, and
     22 to 52 wt % of an ethylene-$C_4$ to $C_8$ alpha olefin copolymer
   wherein the polypropylene homopolymer has a melt flow index of 5 to 150 g/10 min measured at 230° C. under 2.16 kg force according to ISO 1133 and/or a cold xylene soluble fraction of the ethylene-propylene copolymer has an intrinsic viscosity of 2 to 8 dl/g measured in decalin at 135° C. and/or the ethylene-$C_4$ to $C_8$ alpha olefin copolymer has a density of 850 to 880 kg/m$^3$ and a melt flow index of 0.5 to 35 g/10 min measured at 190° C. under 2.16 kg force according to ISO 1133.

2. The composition of claim 1, wherein a cold xylene soluble fraction of the ethylene-propylene copolymer has an intrinsic viscosity of 3 to 8 dl/g measured in decalin at 135° C.

3. The composition of claim 1, wherein the ethylene-$C_4$ to $C_8$ alpha olefin copolymer is polymerized from ethylene and at least one of 1-butene, 1-hexene, and 1-octene.

4. The composition of claim 1, wherein the glass fibers have a filament diameter of 10 to 20 micrometers.

5. The composition of claim 1, further comprising a modified polypropylene, wherein the modified polypropylene is a polypropylene grafted with a carboxylic acid or salts thereof, an anhydride, an ester, or a combination comprising at least one of the foregoing.

6. The composition of claim 5, wherein the modified polypropylene is a homopolypropylene grafted with maleic anhydride.

7. The composition of claim 1, further comprising 0.1 to 5 wt % of a colorant.

8. The composition of claim 1, further comprising a polysiloxane, wherein the polysiloxane comprises an ultra high molecular weight polysiloxane with a kinematic viscosity of greater than $10 \times 10^6$ centistokes as determined in accordance with ASTM D445.

9. The composition of claim 8, wherein the polysiloxane is present in an amount of 0.2 to 10 wt %.

10. The composition of claim 1, wherein the composition further comprises 0.1 to 2 wt % of a thermal stabilizer, a UV stabilizer, a visible light stabilizer, an antioxidant, or a combination comprising one or more of the foregoing.

11. An article made from the composition of claim 1.

12. A soft touch composition comprising, based on the total weight of the composition,
   10 to 40 wt % of glass fibers; and
   50 to 88 wt % of a polymer comprising, based on the total weight of the polymer,
     44 to 52 wt % of a polypropylene homopolymer,
     3 to 30 wt % of an ethylene-propylene copolymer, and
     22 to 52 wt % of an ethylene-$C_4$ to $C_8$ alpha olefin copolymer, and
   further comprising a homopolypropylene grafted with maleic anhydride; wherein a functional group derived from maleic anhydride is present in an amount of greater than or equal to 0.5 wt %, based on the total weight of the homopolypropylene;
   wherein the polypropylene homopolymer has a melt flow index of 5 to 150 g/10 min measured at 230° C. under 2.16 kg force according to ISO 1133 and/or a cold xylene soluble fraction of the ethylene-propylene copolymer has an intrinsic viscosity of 2 to 8 dl/g measured in decalin at 135° C. and/or the ethylene-$C_4$ to $C_8$ alpha olefin copolymer has a density of 850 to 880 kg/m$^3$ and a melt flow index of 0.5 to 35 g/10 min measured at 190° C. under 2.16 kg force according to ISO 1133.

13. The composition of claim 12, wherein the homopolypropylene is present in an amount of 0.1 to 4 wt %, based on the total weight of the composition.

14. A soft touch composition comprising, based on the total weight of the composition,
   10 to 40 wt % of glass fibers; and
   50 to 88 wt % of a polymer comprising, based on the total weight of the polymer, 44 to 52 wt % of a polypropylene homopolymer,
3 to 30 wt % of an ethylene-propylene copolymer, and
22 to 52 wt % of an ethylene-$C_4$ to $C_8$ alpha olefin copolymer, and
further comprising a silicone particle having the formula (I)

$$R_xSiO_{2-(x/2)} \quad (I)$$

wherein x is a positive number greater than or equal to 1, and each R is independently an aliphatic hydrocarbon group, an aromatic hydrocarbon, or an unsaturated group;
 wherein the polypropylene homopolymer has a melt flow index of 5 to 150 g/10 min measured at 230° C. under 2.16 kg force according to ISO 1133 and/or a cold xylene soluble fraction of the ethylene-propylene copolymer has an intrinsic viscosity of 2 to 8 dl/g measured in decalin at 135° C. and/or the ethylene-$C_4$ to $C_8$ alpha olefin copolymer has a density of 850 to 880 kg/m$^3$ and a melt flow index of 0.5 to 35 g/10 min measured at 190° C. under 2.16 kg force according to ISO 1133.

15. The composition of claim 14, wherein the silicone particle comprises methylsilsequioxane.

16. The composition of claim 14, wherein the silicone particle has a mean particle diameter of 1.8 to 10.5 micrometers.

17. The composition of claim 14, wherein the silicone particle is present in an amount of 1 to 5 wt %, based on the total weight of the composition.

* * * * *